United States Patent
Fukui et al.

(10) Patent No.: US 9,428,075 B2
(45) Date of Patent: Aug. 30, 2016

(54) BATTERY CHARGING MANAGEMENT SYSTEM OF AUTOMATED GUIDED VEHICLE AND BATTERY CHARGING MANAGEMENT METHOD

(71) Applicant: NISSAN MOTOR CO., LTD., Yokohama-shi, Kanagawa (JP)

(72) Inventors: Toshihito Fukui, Machida (JP); Mitsuru Hirayama, Isehara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/418,283

(22) PCT Filed: Jul. 31, 2013

(86) PCT No.: PCT/JP2013/070706
§ 371 (c)(1),
(2) Date: Jan. 29, 2015

(87) PCT Pub. No.: WO2014/021363
PCT Pub. Date: Feb. 6, 2014

(65) Prior Publication Data
US 2015/0258908 A1    Sep. 17, 2015

(30) Foreign Application Priority Data
Aug. 2, 2012   (JP) .................................. 2012-171713

(51) Int. Cl.
*H02J 7/00* (2006.01)
*H02J 7/14* (2006.01)
(Continued)

(52) U.S. Cl.
CPC .............. *B60L 11/1861* (2013.01); *B60L 3/00* (2013.01); *B60L 11/18* (2013.01); *B60L 11/1816* (2013.01); *H02J 7/0003* (2013.01); *H02J 7/0027* (2013.01); *H02J 7/0077* (2013.01)

(58) Field of Classification Search
CPC ... H02J 7/00; B60L 11/1816; B60L 11/1861; B60L 3/00; G05D 1/02
USPC ........................................ 320/162, 109, 104
See application file for complete search history.

(56) References Cited

U.S. PATENT DOCUMENTS

| | | | | |
|---|---|---|---|---|
| 5,200,689 | A | * | 4/1993 | Interiano ............ G01R 31/3624 320/149 |
| 5,545,967 | A | * | 8/1996 | Osborne .................. B60S 5/06 104/34 |

(Continued)

FOREIGN PATENT DOCUMENTS

| | | |
|---|---|---|
| JP | 2-49341 U | 4/1990 |
| JP | 3-27732 A | 2/1991 |

(Continued)

*Primary Examiner* — M'Baye Diao
(74) *Attorney, Agent, or Firm* — Foley & Lardner LLP

(57) ABSTRACT

Disclosed is a battery charging management system of an automated guided vehicle that travels in an unpiloted manner by using a mounted battery as a driving source, the mounted battery being charged in a charging station, wherein a battery charging controller that monitors a remaining capacity of the mounted battery is mounted on the automated guided vehicle, the battery charging controller starts a charging operation for the mounted battery in the charging station when the remaining capacity of the battery is lower than a predetermined value, and a charging route of the vehicle is cut off when a charging amount of the mounted battery reaches a predetermined capacity during the charging operation.

7 Claims, 10 Drawing Sheets

(51) Int. Cl.
  *B60L 11/18*   (2006.01)
  *B60L 3/00*   (2006.01)

(56)    References Cited

U.S. PATENT DOCUMENTS

| | | | | |
|---|---|---|---|---|
| 6,335,611 | B1* | 1/2002 | Sasaki | G01R 19/0092 |
| | | | | 320/128 |
| 6,435,313 | B2* | 8/2002 | Tajima | 187/290 |
| 6,847,127 | B1* | 1/2005 | Lee | B60L 11/1861 |
| | | | | 290/40 C |
| 7,193,394 | B2* | 3/2007 | Ueda | B60L 11/1809 |
| | | | | 320/128 |
| 7,358,701 | B2* | 4/2008 | Field | B60L 3/12 |
| | | | | 320/104 |
| 7,821,306 | B2* | 10/2010 | Tagome | H03K 17/04123 |
| | | | | 327/108 |
| 7,888,911 | B2* | 2/2011 | Wong | B60L 11/185 |
| | | | | 320/132 |
| 7,928,735 | B2* | 4/2011 | Huang | B60L 11/1857 |
| | | | | 320/132 |
| 8,305,038 | B2* | 11/2012 | Maruyama | H01M 10/425 |
| | | | | 320/118 |
| 8,410,755 | B2* | 4/2013 | Chau | B60L 3/0046 |
| | | | | 320/118 |
| 8,471,522 | B2* | 6/2013 | Virk | B66F 9/063 |
| | | | | 180/65.21 |
| 8,890,483 | B2* | 11/2014 | Nakatsuji | H01M 2/34 |
| | | | | 320/134 |
| 2010/0138095 | A1 | 6/2010 | Redmann, Jr. et al. | |
| 2010/0308769 | A1 | 12/2010 | Baba | |
| 2011/0254513 | A1* | 10/2011 | Kagoshima | B60W 30/1888 |
| | | | | 320/162 |
| 2012/0169290 | A1* | 7/2012 | Nakashima | H01M 10/44 |
| | | | | 320/134 |
| 2012/0207620 | A1* | 8/2012 | Dalum | B60K 6/12 |
| | | | | 417/44.1 |
| 2013/0169211 | A1* | 7/2013 | Brun-Buisson | H01M 10/44 |
| | | | | 320/101 |
| 2013/0176401 | A1* | 7/2013 | Monari | H04N 5/2252 |
| | | | | 348/47 |
| 2014/0239912 | A1* | 8/2014 | Hanada | H02J 7/00 |
| | | | | 320/134 |

FOREIGN PATENT DOCUMENTS

| | | |
|---|---|---|
| JP | 07-255105 A | 10/1995 |
| JP | 2007-074800 A | 3/2007 |

* cited by examiner

BATTERY CHARGING MANAGEMENT SYSTEM OF AUTOMATED GUIDED VEHICLE AND BATTERY CHARGING MANAGEMENT METHOD

TECHNICAL FIELD

This invention relates to a battery charging management system and a battery charging management method of an automated guided vehicle that travels in an unpiloted manner by using electric power of a mounted battery as a driving source and charges the mounted battery in a charging station.

BACKGROUND ART

In an automated guided vehicle discussed in JP 2-49341 U, a lead-acid battery is mounted as a battery of the automated guided vehicle. This battery of the automated guided vehicle is periodically replaced with a new battery that is fully charged. Alternatively, using a battery charger of a charging station, the mounted battery is automatically charged to a full charge level.

In an automated guided vehicle discussed in JP 2007-74800 A, a nickel hydrogen battery or a lithium ion battery that can be used in both a partial charge operation and a full charge operation is mounted as a battery. In this automated guided vehicle, a charging state is controlled such that a charging operation starts when a remaining capacity of the battery reaches a charging start capacity, and the charging operation stops when the remaining capacity reaches a charging stop capacity.

In addition, in the automated guided vehicle discussed in JP 3-27732 A, batteries having different capacities and voltages are mounted in the respective automated guided vehicles. Furthermore, an identification (ID) tag corresponding to a type of the battery is installed. In the charging station, a type of the mounted battery is determined depending on the ID tag, and the battery is charged to satisfy an appropriate charging condition such as a charging voltage or a charging current.

SUMMARY OF INVENTION

However, the inventors studied whether or not the automated guided vehicle of the lithium ion battery discussed in JP 2007-74800 A is loaded into a conveyance process of the automated guided vehicle having the lead-acid battery discussed in JP 2-49341 U. The charging station used in the conveyance process of the automated guided vehicle for a lead-acid battery is already installed with the automatic battery charger for a lead-acid battery. This automatic battery charger is provided with a power supply unit that can supply a charging voltage up to 28 V at maximum for charging the lead-acid battery. For this reason, as discussed in JP 2007-74800 A, in order to load the automated guided vehicle having a lithium ion battery instead of a lead-acid battery as a battery into the conveyance process, it is necessary to entirely exchange the automatic battery charger provided in the charging station with that having a power supply unit having a maximum charging voltage adjusted for the lithium ion battery. This necessitates high costs.

Therefore, as a transient method, it is conceived that an automated guided vehicle having a lead-acid battery and an automated guided vehicle having a lithium ion battery are used in a combined manner. In this case, as discussed in JP 3-27732 A, it is also conceived that the automated guided vehicle is provided with an identification (ID) tag corresponding to the mounted battery, a type of the battery is determined based on the ID tag, and the charging voltage changes depending on the type of the battery, so that the charging operation can be performed depending on the type of the battery. However, (1) due to the ID tag, both the battery and the battery charger necessitate high costs. (2) If the ID tag is different when the battery is replaced, the battery may be overcharged. (3) Since a voltage switching control is provided in the automatic battery charger, this necessitates high costs.

This invention has been made in view of the problems of the prior art described above. This invention provides a battery charging management system and a battery charging management method of an automated guided vehicle suitable for charging an automated guided vehicle in which different types of batteries are mounted.

According to an aspect of this invention, there is provided a battery charging management system of an automated guided vehicle that travels in an unpiloted manner by using a mounted battery as a power source and charges the mounted battery in the charging station, in which a battery charging controller that monitors a remaining capacity of the mounted battery is mounted in the automated guided vehicle. In addition, the battery charging controller starts the charging operation for the mounted battery in the charging station when the remaining capacity of the battery is lower than a predetermined value. The battery charging controller cuts off a charging route of the vehicle when the charging amount of the mounted battery during the charging operation reaches a predetermined capacity.

DESCRIPTION OF EMBODIMENTS

Hereinafter, embodiments of this invention will be described with reference to the accompanying drawings.

First Embodiment

Figure 1:
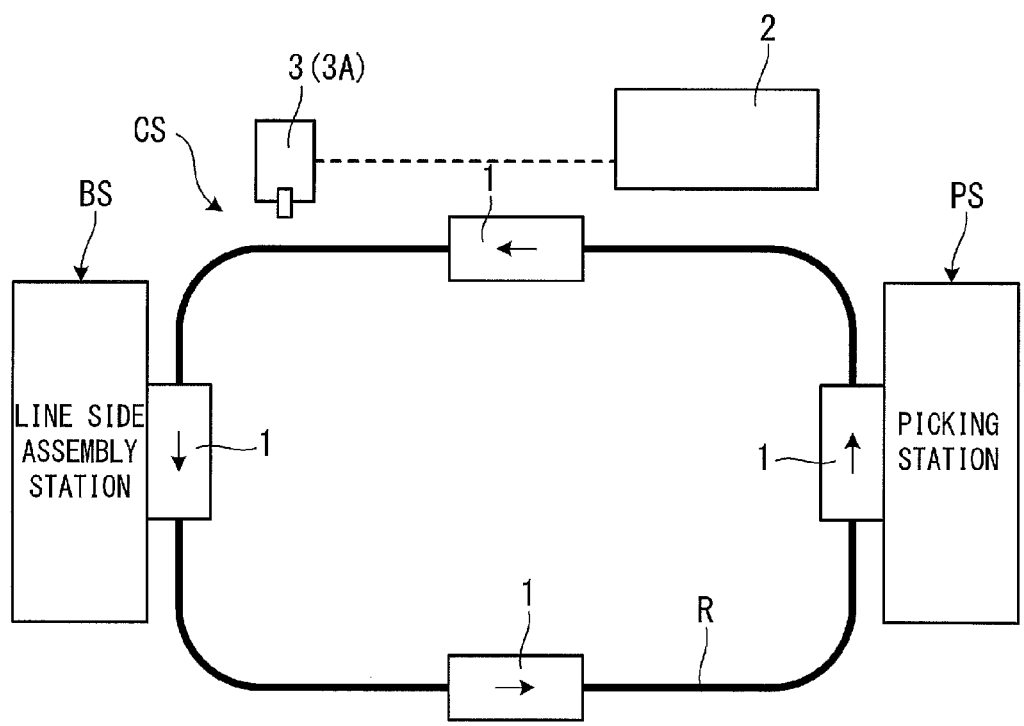
FIG. 1 is a conceptual diagram illustrating an exemplary travel route of an automated guided vehicle according to a first embodiment.

A travel route of an automated guided vehicle during a conveyance process is a travel route R of an orbiting track set to circulates between a picking station PS and an assembly station BS of a line side, for example, as illustrated in FIG. 1. In the conveyance process, a plurality of automated guided vehicles 1 travel along the travel route R. The travel of each automated guided vehicle 1 is controlled by an equipment-side control device 2. In the picking station PS, components necessary in the assembly station BS are loaded on the automated guided vehicle 1. Then, the automated guided vehicle 1 travels along the travel route R to convey the components loaded in the picking station PS to the assembly station BS, and the loaded components are unloaded in the assembly station BS. In addition, the automated guided vehicle 1 travels along the travel route R again to return to the picking station PS. The automated guided vehicle 1 repeats this circulation travel.

Figure 2:
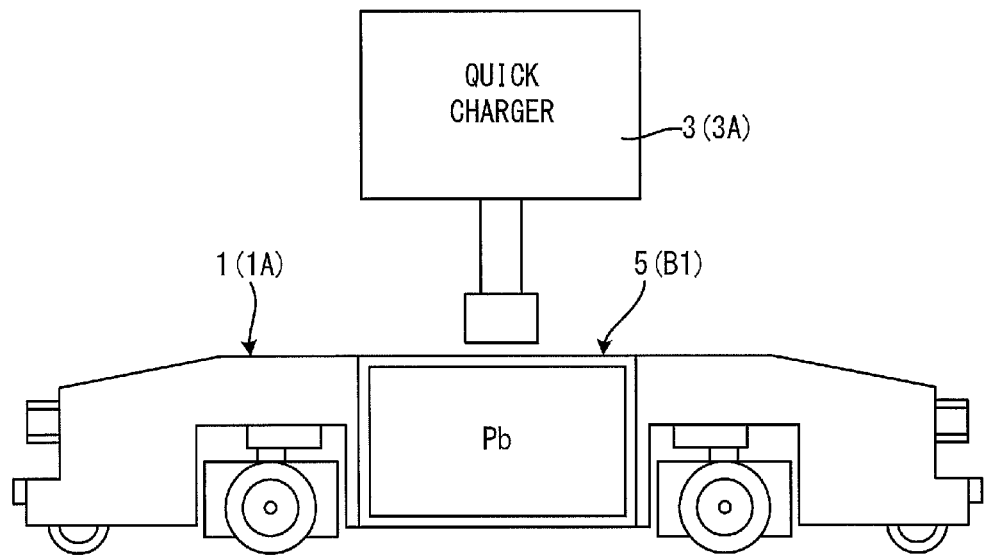
FIG. 2 is an explanatory diagram schematically illustrating an automated guided vehicle having a lead-acid battery as a battery and an automatic battery charger of a charging station.
Figure 3:
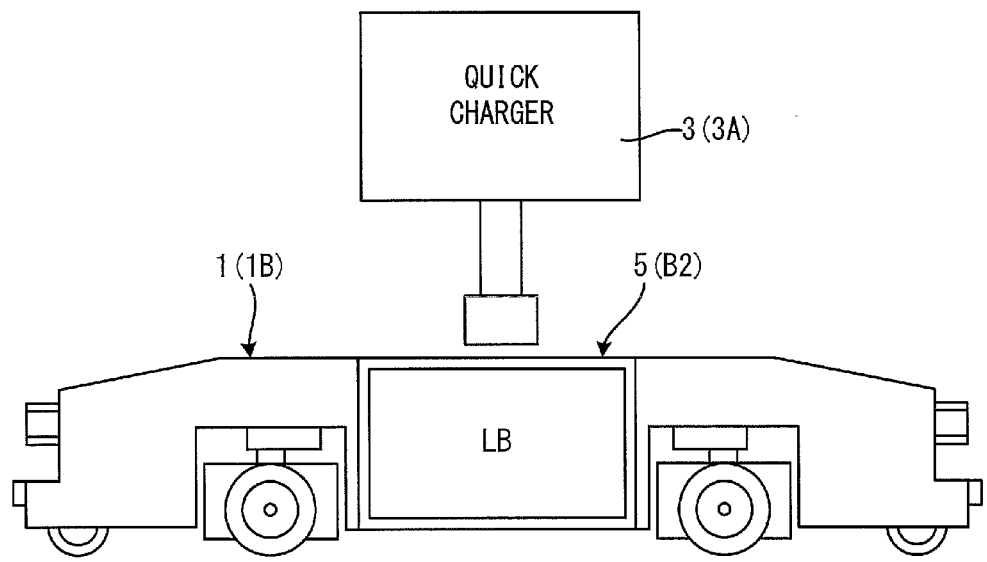
FIG. 3 is an explanatory diagram schematically illustrating an automated guided vehicle having a lithium ion secondary battery as a battery and an automatic battery charger of a charging station.

The automated guided vehicle 1 comprises a battery box 5 for housing a battery B consisting of a secondary battery (such as a lead-acid battery or a lithium ion secondary battery), for example, in a center of the vehicle as illustrated in FIGS. 2 and 3. The automated guided vehicle 1A of FIG. 2 has a lead-acid battery as the battery B1. The automated guided vehicle 1B of FIG. 3 has a lithium ion secondary battery as the battery B2. The automated guided vehicle 1 travels by using the battery B as a driving power supply. For this reason, when the charging capacity of the battery B decreases from a predetermined range, and the automated guided vehicle 1 is parked in the charging station CS on the travel route R, the battery B is charged using the automatic battery charger 3. The automatic battery charger 3 is supplied with charging power from a DC power supply 21.

In the battery charging management system of the automated guided vehicle according to this embodiment, an automated guided vehicle 1A that uses a battery B1 such as a lead-acid battery employed widely in the prior art as a driving power source is used as illustrated in FIG. 2. In addition, in the conveyance process as a premise of this embodiment, an automatic battery charger 3A used in a lead-acid battery widely employed in the prior art for charging the battery B1 of the automated guided vehicle 1A is installed in the charging station CS. In addition, according to this embodiment, in the conveyance process as a premise, it is assumed that a new automated guided vehicle 1B that uses the battery B2 of a lithium ion secondary battery as a driving power source is sequentially loaded as illustrated in FIG. 3. That is, according to this embodiment, all of the batteries of the automated guided vehicles 1 are not entirely replaced. Instead, the battery B1 is sequentially converted into the battery B2, and the automatic battery charger 3 of the charging station CS is also sequentially converted from the lead-acid battery type to the lithium ion battery type. Hereinafter, the automated guided vehicle 1A that uses the battery B1 widely employed in the prior art as a driving power source will be referred to as a "PB-type automated guided vehicle," and the automated guided vehicle 1B that uses the new battery B2 as a driving power source will be referred to as a "LB-type automated guided vehicle."

Figure 4:
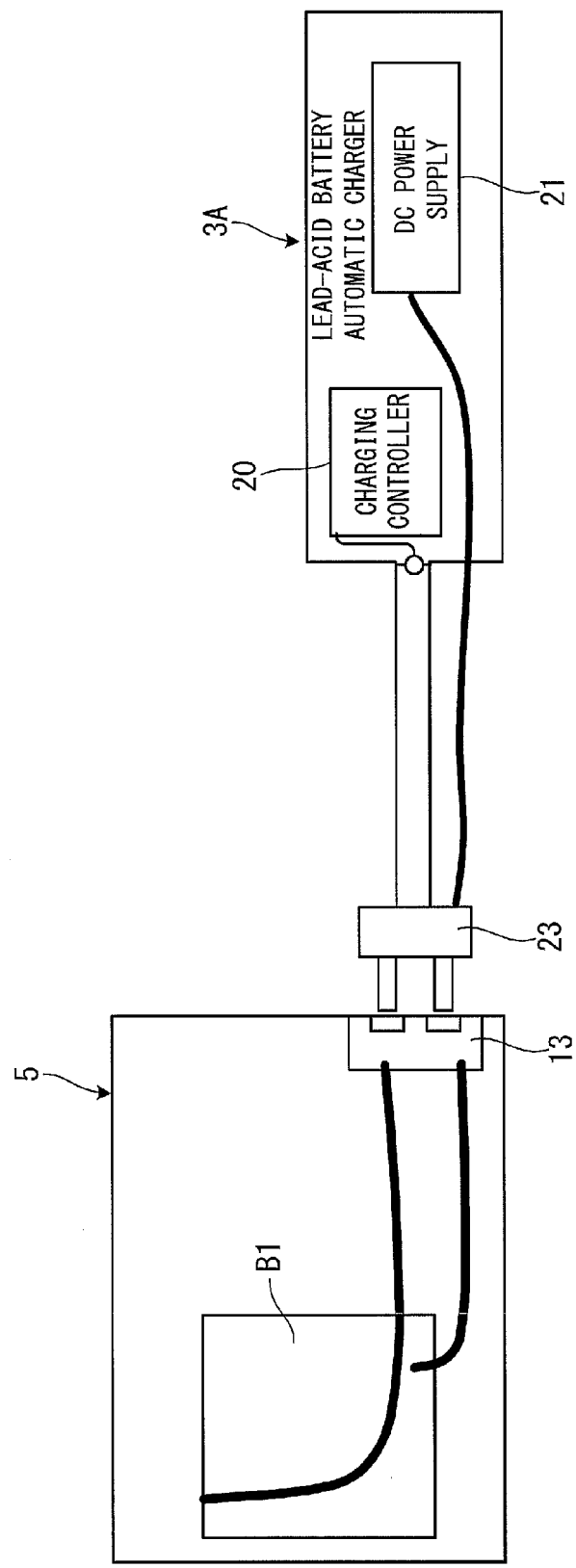
FIG. 4 is an explanatory diagram illustrating a relationship between a battery unit having a lead-acid battery of the automated guided vehicle and a battery charger of the charging station during a charging operation.

First, a description will be made for the PB-type automated guided vehicle 1A and the automatic battery charger 3A of the charging station CS in the conveyance process as a premise. The battery box 5 of the PB-type automated guided vehicle 1A has the battery B1 obtained by connecting lead-acid batteries in series as illustrated in FIG. 4. The electric power of the battery B1 is supplied to a driving motor not illustrated and the like as a power source. A charge/discharge state of the battery B1 is monitored by a controller (not illustrated) mounted in the vehicle. The controller detects a voltage, a temperature, and the like of the battery B1 and computes a charging capacity of the battery B1. In addition, the controller determines whether or not a charging operation is necessary based on the computed charging capacity (battery voltage). In the battery B1, it is determined that the charging operation is necessary, for example, when the battery voltage is lower than 21 V.

If it is determined that the charging operation is necessary, the controller performs control such that the PB-type automated guided vehicle 1A is parked in the charging station CS on the travel route R. In addition, if it is identified that the PB-type automated guided vehicle 1A is parked in a predetermined position of the charging station CS as illustrated in FIG. 4, the automatic battery charger 3A of the charging station CS drives the feeding contactor 23 toward the PB-type automated guided vehicle 1. If the feeding contactor 23 is connected to the receiving contactor 13, a chargeable state is established.

The automatic battery charging unit 3A comprises a DC power supply 21 capable of boosting the charging voltage value to, for example, 29 V and a charging controller 20 activated as the feeding contactor 23 and the receiving contactor 13 are connected to each other to control a charging current value and a charging voltage value supplied from the DC power supply 21 to the battery B1.

Figure 5:
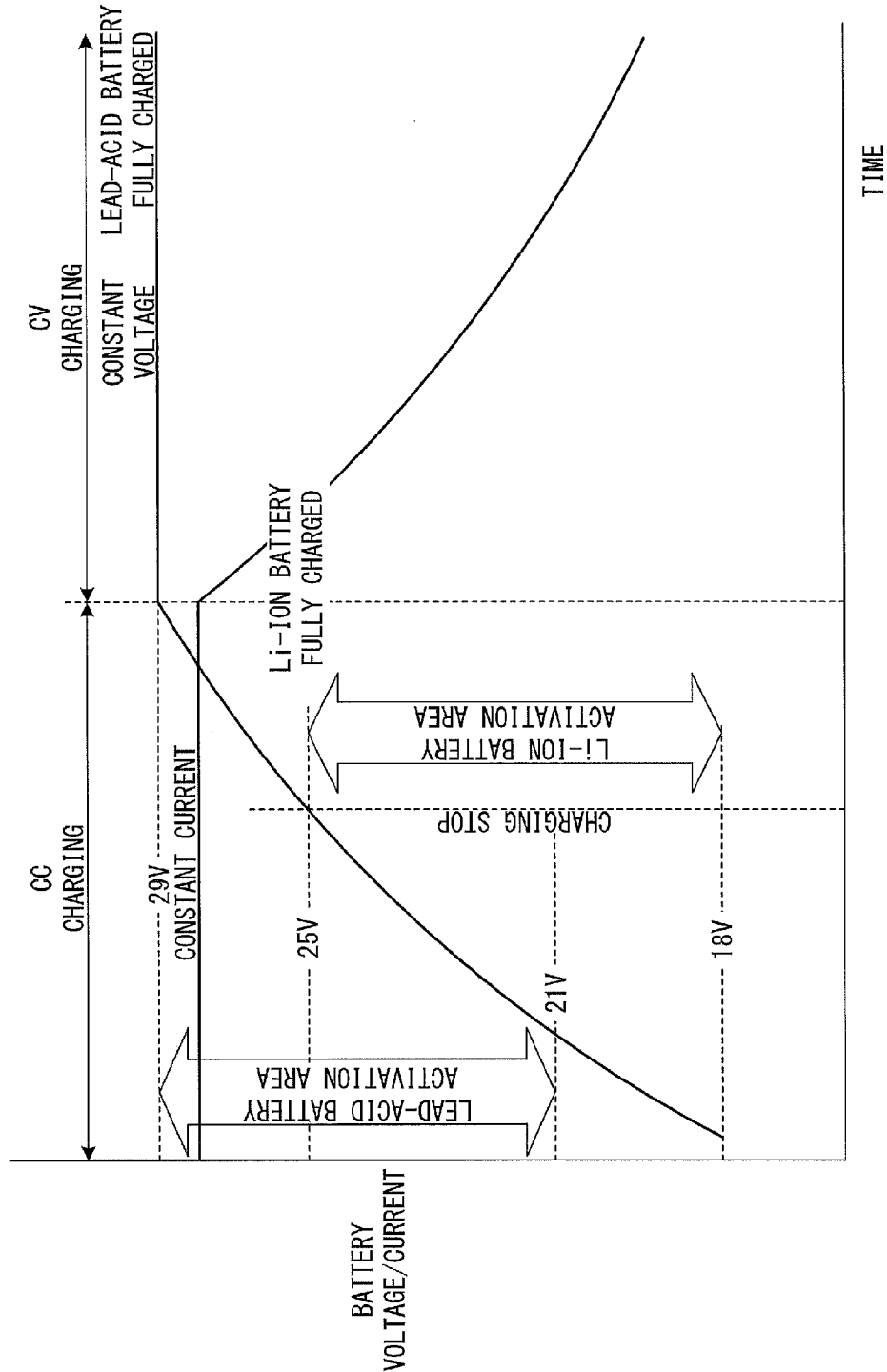
FIG. 5 is a battery charging characteristic diagram illustrating a change of a battery voltage and a change of the supplied charging current during the charging operation.

The charging controller 20 charges the battery B1 in a fast charging mode. The fast charging mode is a constant current and constant voltage type charging method in which a charging current larger than that of a normal charging operation is supplied to the battery B1. The fast charging mode is suitable for a conveyance process in which a short time charging operation is necessary. Meanwhile, the charging controller 20 can also perform a constant-current/constant-voltage type normal charging mode. In the constant-current/constant-voltage type charging mode, a constant current charging (CC charging) operation is performed in an initial stage of the charging operation, in which a constant charging current is supplied. After the battery voltage increases to a full charging voltage (for example, 29 V) by continuously performing the charging operation, a constant voltage charging (CV charging) operation in which a voltage is constant is executed until a predetermined time elapses. FIG. 5 is a characteristic diagram illustrating a change of the battery voltage during the charging operation and a change of the supplied charging current. The battery voltage gradually increases through the CC charging operation. As the battery voltage increases to the full charging voltage (for example, 29 V), a constant voltage charging (CV charging) operation in which a voltage is constant is executed by reducing the charging current from that timing until a predetermined time elapses. As the predetermined time elapses, the charging controller 20 stops the DC power supply 21 to interrupt the charging operation. In addition, the feeding contactor 23 is retreated and is disconnected from the receiving contactor 13 of the automated guided vehicle 1. Then, the PB-type automated guided vehicle 1A travels along the travel route R to recede from the charging station CS.

Figure 6:
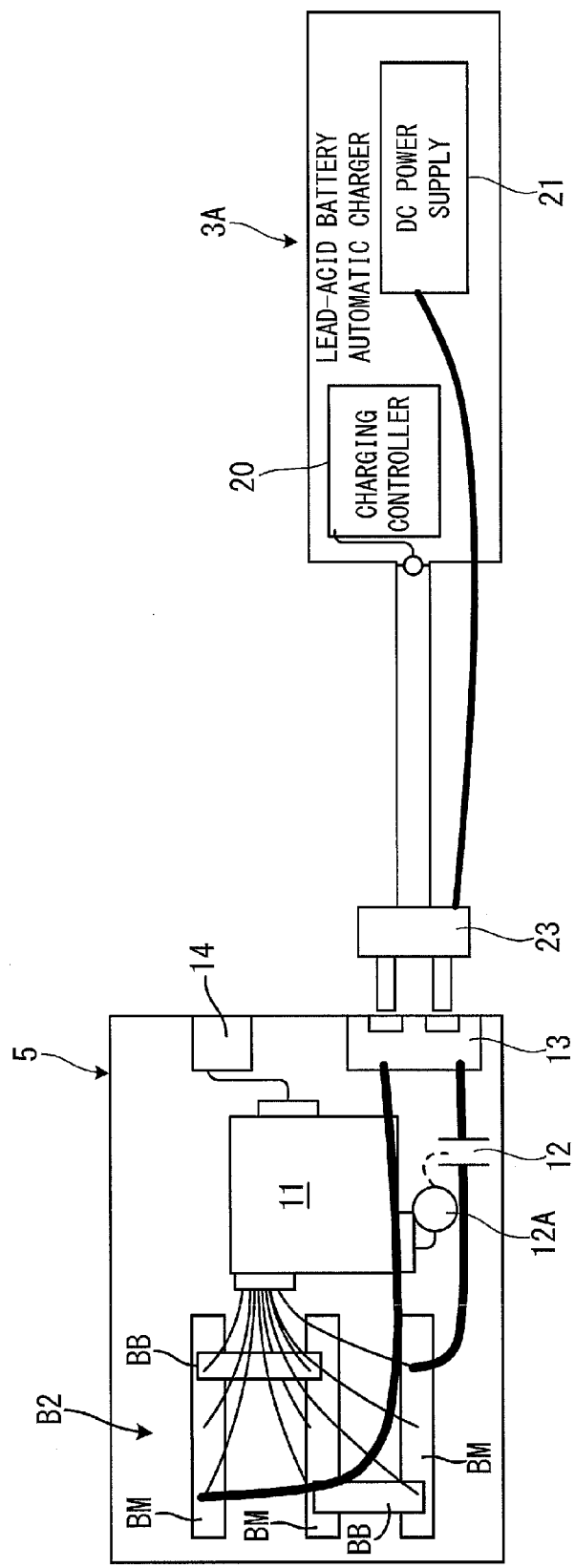
FIG. 6 is an explanatory diagram illustrating a relationship between a battery unit having a lithium ion secondary battery of the automated guided vehicle and a battery charger of the charging station during a charging operation.

The LB-type automated guided vehicle 1B comprises the battery B2 formed from a lithium ion battery as illustrated in FIG. 6. In addition, the LB-type automated guided vehicle 1B comprises the battery charging controller 11 mounted in the vehicle. The battery charging controller 11 is a controller for monitoring, computing, and controlling the charging state of the battery B2.

If it is determined that the charging operation is necessary, the battery charging controller 11 starts a power receiving preparation operation. In the power receiving preparation operation, the battery charging controller 11 instructs the power receiving control relay 12A to change the power switch 12 provided in the charging route between the battery B2 and the charging contactor 13 from a turn-off state to a turn-on state in order to obtain a chargeable state. As the charging operation starts, and the battery voltage increases to a predetermined voltage, the battery charging controller 11 instructs the power receiving control relay 12A to change the power switch 12 from the turn-on state to the turn-off state in order to stop the charging operation.

The battery B2 is, for example, a lithium ion secondary battery. The battery B2 has a battery module BM connected in series through the busbar BB. In FIG. 6, three battery modules BM are connected in series.

The battery module BM consists of a plurality of lithium ion unit cells connected in parallel or in series. A voltage of the battery module BM is set to, approximately, 8 V in a charging state. Since the battery B2 has three battery modules BM connected in series, the output voltage of the battery B2 becomes approximately 25 V. Therefore, an overcharge voltage of the battery B2 is set to, for example, 25.02 V, and an overdischarge voltage is set to, for example, 18 V. The charging start and charging completion voltages are set to, for example, 21 V and 24 V, respectively, between the overcharge voltage and the overdischarge voltage. By setting a larger voltage difference between the overdischarge voltage and the charging start voltage in this manner, the battery B2 is protected from reaching the overdischarge voltage.

The battery charging controller 11 can externally transmit a charging amount (voltage) of the LB-battery B2, an input/output current amount (ampere-hour, AH) of the LB-battery B2, a history of failure of the LB-battery B2, and the like using a communication unit 14 (for example, optical communication).

When the battery voltage decreases under the charging start voltage, the battery charging controller 11 causes the LB-type automated guided vehicle 1B to stop in the charging station CS on the travel route R. In addition, if it is determined that the LB-type automated guided vehicle 1B stops in a predetermined position of the charging station CS, the automatic battery charger 3A of the charging station CS expands the feeding contactor 23 to the LB-type automated guided vehicle 1B as illustrated in FIG. 6. As the feeding contactor 23 is connected to the receiving contactor 13, a chargeable state is established.

If the battery B2 has a charging completion state, the power switch 12 is opened, and the charging current of the automatic battery charger 3A stops. In addition, by retreating the feeding contactor 23, the receiving contactor 13 of the LB-type automated guided vehicle 1B is disconnected from the feeding contactor 23. Then, the LB-type automated guided vehicle 1B is released from the charging station CS and travels along the travel route R.

In the conveyance process, the automatic battery charger 3A for the battery B1 is already installed in the charging station CS. While the PB-type automated guided vehicle 1A having the battery B1 and the LB-type automated guided vehicle 1B having a new battery B2 are mixedly provided on the travel route R, the components are loaded and conveyed from the picking station PS to the assembly station BS.

When the battery voltage decreases, and the charging operation is necessary, the PB-type automated guided vehicle 1A stops in the charging station CS on the travel route R and is charged in the sequence described above.

If the battery B is fully charged, the automatic battery charger 3A determines that the charging operation is completed, so that the receiving contactor 13 of the PB-type automated guided vehicle 1A is disconnected by retreating the feeding contactor 23. Then, the PB-type automated guided vehicle 1A travels along the travel route R so as to recede from the charging station CS.

In the LB-type automated guided vehicle 1B, if the battery charging controller 11 mounted in the vehicle determines that the battery voltage decreases, and the charging operation is necessary, the power switch 12 switches from an open state to a closed state by activating the power receiving control relay 12A in response to a command from the battery charging controller 11. In addition, the LB-type automated guided vehicle 1B stops in the charging station CS in response to a command from the battery charging controller 11. If it is identified that the LB-type automated guided vehicle 1B stops in a predetermined position of the charging station CS, the automatic battery charger 3A of the charging station CS expands the feeding contactor 23 to the LB-type automated guided vehicle 1B as illustrated in FIG. 6. As the feeding contactor 23 is connected to the receiving contactor 13, a chargeable state is established.

As the feeding contactor 23 and the receiving contactor 13 are connected to each other, the automatic battery charging unit 3A activates the DC power supply 21 to control a charging current value and a charging voltage value supplied to the charging battery B2 from the DC power supply 21. Specifically, similar to the charging operation of the battery B1, a constant current charging (CC charging) operation for supplying a constant charging current is performed in an initial stage of the charging operation as illustrated in FIG. 5.

The battery voltage increases from the charging start voltage as the charging operation is performed. The increase of the battery voltage is monitored by the battery charging controller 11 mounted on the vehicle and the equipment-side charging controller 20. As the battery voltage reaches the charging completion voltage, the battery charging controller 11 mounted on the vehicle activates the power receiving control relay 12A to turn off the power switch 12 and disconnect the battery B2 from the receiving contactor 13 to terminate the charging operation. As the electric current flowing to the battery B2 through the feeding contactor 23 decreases to zero by turning off the power switch 12, the automatic battery charger 3A of the charging station CS stops the DC power supply 21 to interrupt the charging operation.

Then, the automatic battery charger 3A of the charging station CS disconnects the receiving contactor 13 of the LB-type automated guided vehicle 1B by retreating the feeding contactor 23. As the contactors 13 and 23 are disconnected from each other, the LB-type automated guided vehicle 1B is released from the charging station CS and travels along the travel route R.

Figure 7:
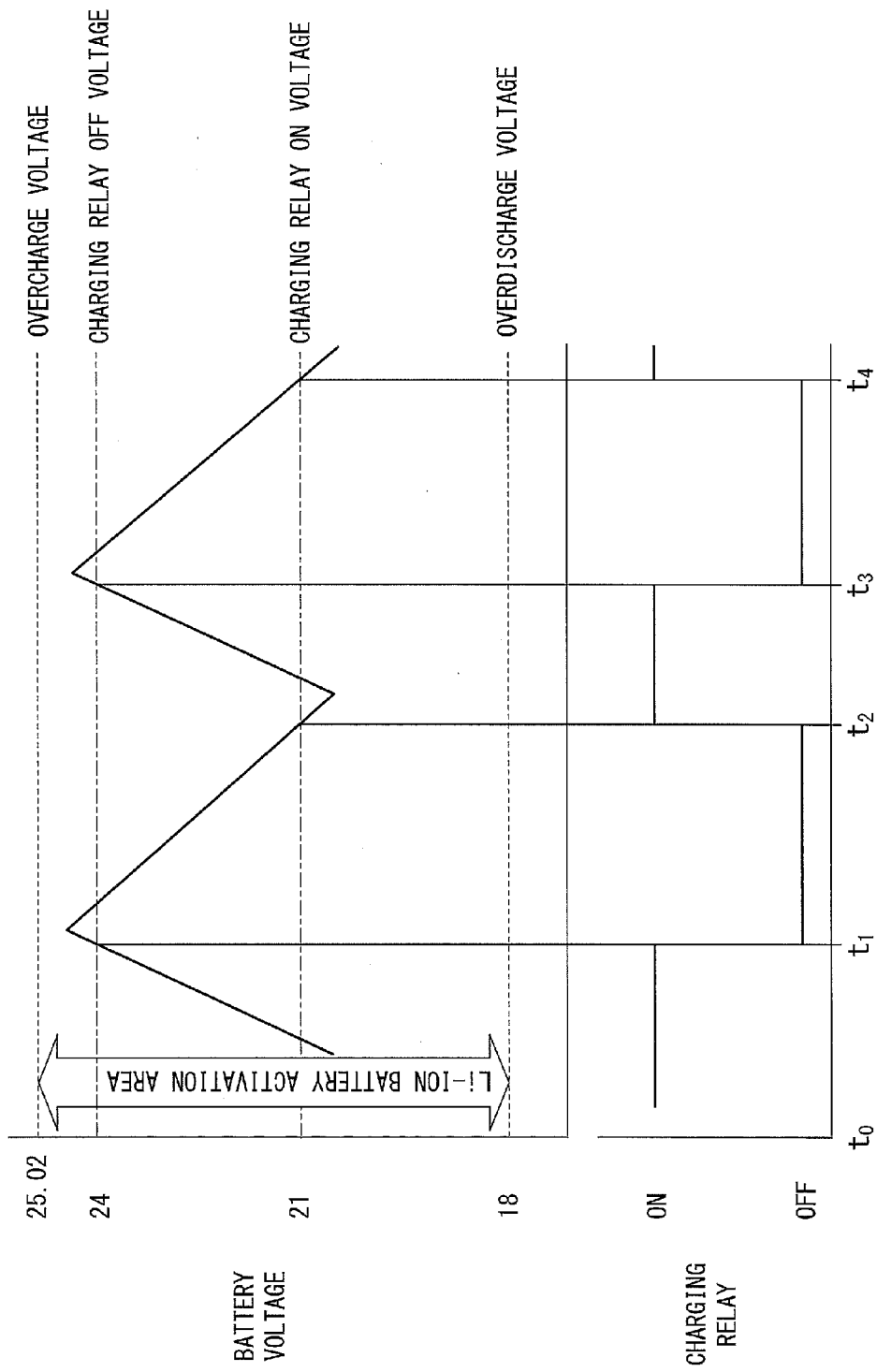
FIG. 7 is an explanatory diagram illustrating a change of the voltage of the lithium ion battery.

The battery voltage of the LB-type automated guided vehicle 1B having the battery B2 changes as illustrated in FIG. 7. That is, at the timings t0, t2, and t4, when the battery voltage is lower than the charging start voltage, the power switch 12 is closed by operating the charging control relay 12A. At the timings t1 and t3, when the battery voltage is higher than the receiving completion voltage, the power switch 12 switches from a closed state to an open state using the charging control relay 12A. For this reason, the battery voltage increases from a state lower than a charging relay turn-on voltage to a state higher than a charging relay turn-off voltage whenever the charging operation is performed. As the LB-type automated guided vehicle 1B travels along the travel route R, the battery power is consumed, so that the battery voltage gradually decreases from a state higher than the charging relay turn-off voltage to a state lower than the charging relay turn-on voltage.

According to this embodiment, it is possible to obtain the following effects.

(1) There is provided a battery charging management system of an automated guided vehicle 1 that travels in an unpiloted manner by using a mounted battery B as a driving source and performs a charging operation for the mounted battery B in a charging station CS. The automated guided vehicle 1 has a lithium ion battery B2 as the mounted battery B and a battery charging controller 11 that monitors a remaining capacity of the mounted battery B2. In addition, when the remaining capacity of the battery B2 is lower than a predetermined value, the battery charging controller 11 causes the charging station CS to start the charging operation for the mounted battery B2. In addition, when the charging amount of the mounted battery B2 reaches a predetermined capacity during the charging operation, the battery charging controller 11 terminates the charging operation for the mounted battery B2 by switching the power switch 12 as a power receiving control switch provided in a charging route of the vehicle to a turn-off state.

That is, when the battery charging controller 11 mounted on the automated guided vehicle 1 side determines that the charging operation of the mounted battery B2 is terminated, a charging route is cut off using the power switch 12 as a power receiving control switch, so that the charging operation is terminated. Therefore, the automatic battery charger 3A provided in the charging station CS does not need to change a charging condition depending on the type of the battery mounted on the automated guided vehicle 1. For this reason, it is possible to directly use, as the battery charger for the lithium ion battery B2, the battery charger 3A for the lead-acid battery already provided in the conveyance process as a battery charger installed in the charging station. In addition, since a device for discriminating the type of the mounted battery B is not necessary unlike the prior art, it is possible to reduce the cost of the battery charge. Furthermore, even when, for example, the battery charger 3A for a lead-acid battery having a high setting value of a final voltage for the charging operation is used, it is possible to charge the lithium ion battery B2 while overcharging is avoided.

(2) When the remaining capacity of the mounted battery B2 is lower than a predetermined value, the battery charging controller 11 causes the power switch 12 as a power receiving control switch provided in the middle of the charging route of the vehicle to switch from a turn-off state to a turn-on state. For this reason, when the battery charger 3A for the lead-acid battery having an operable voltage range wider than that of the lithium ion battery B2 is used as a battery charger of the lithium ion battery B2, a voltage range desired to be used in the lithium ion battery B2 can be set arbitrarily by performing designation using the battery charging controller 11. As a result, it is possible to always use an intermediate capacity range where use efficiency is high as a nature of the lithium ion battery B2 and increase a service life of the lithium ion battery B2.

Second Embodiment

Figure 8:
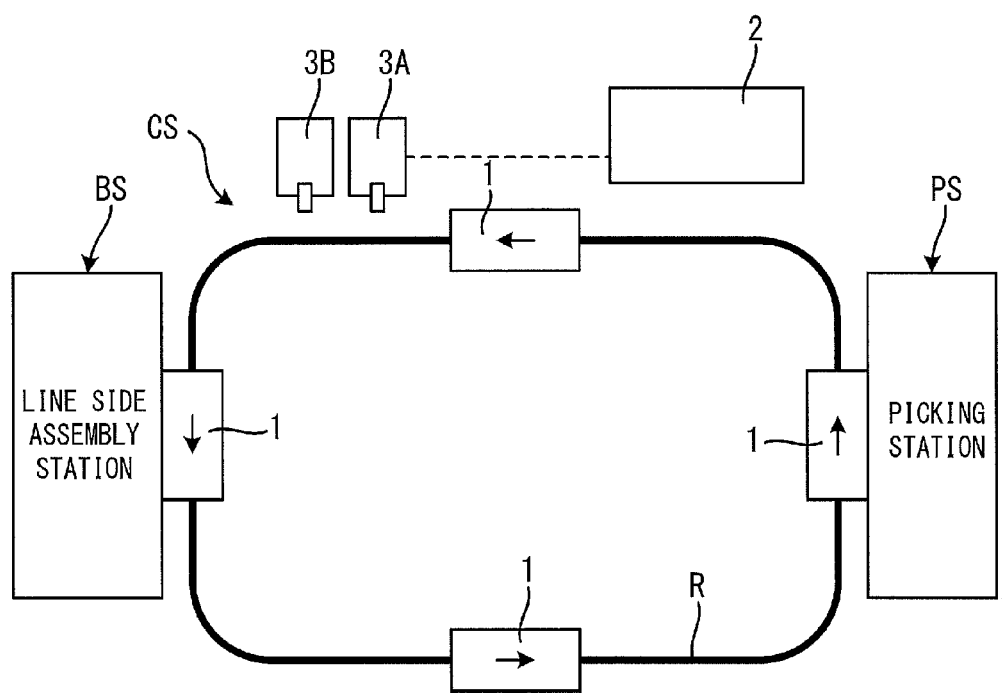
FIG. 8 is a conceptual diagram illustrating a travel route of the automated guided vehicle according to a second embodiment of this invention.
Figure 9:
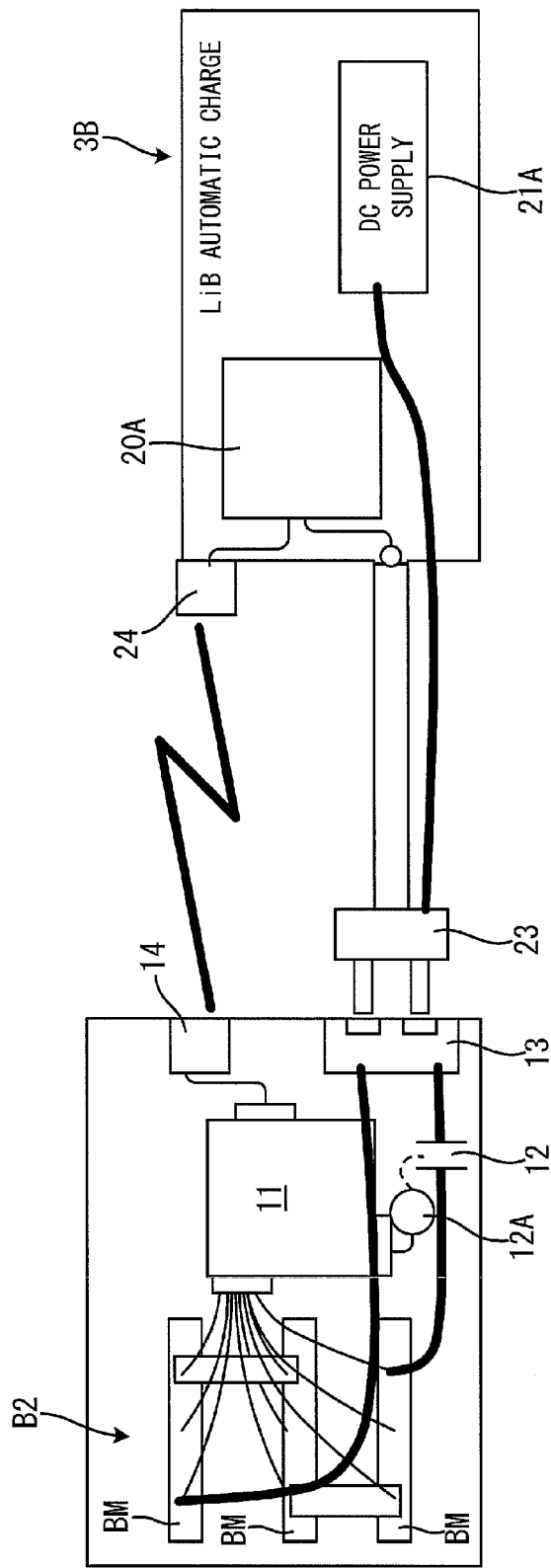
FIG. 9 is an explanatory diagram illustrating a relationship between a battery unit having a lithium ion secondary battery of the automated guided vehicle and a battery charger of the charging station during a charging operation according to the second embodiment.
Figure 10:
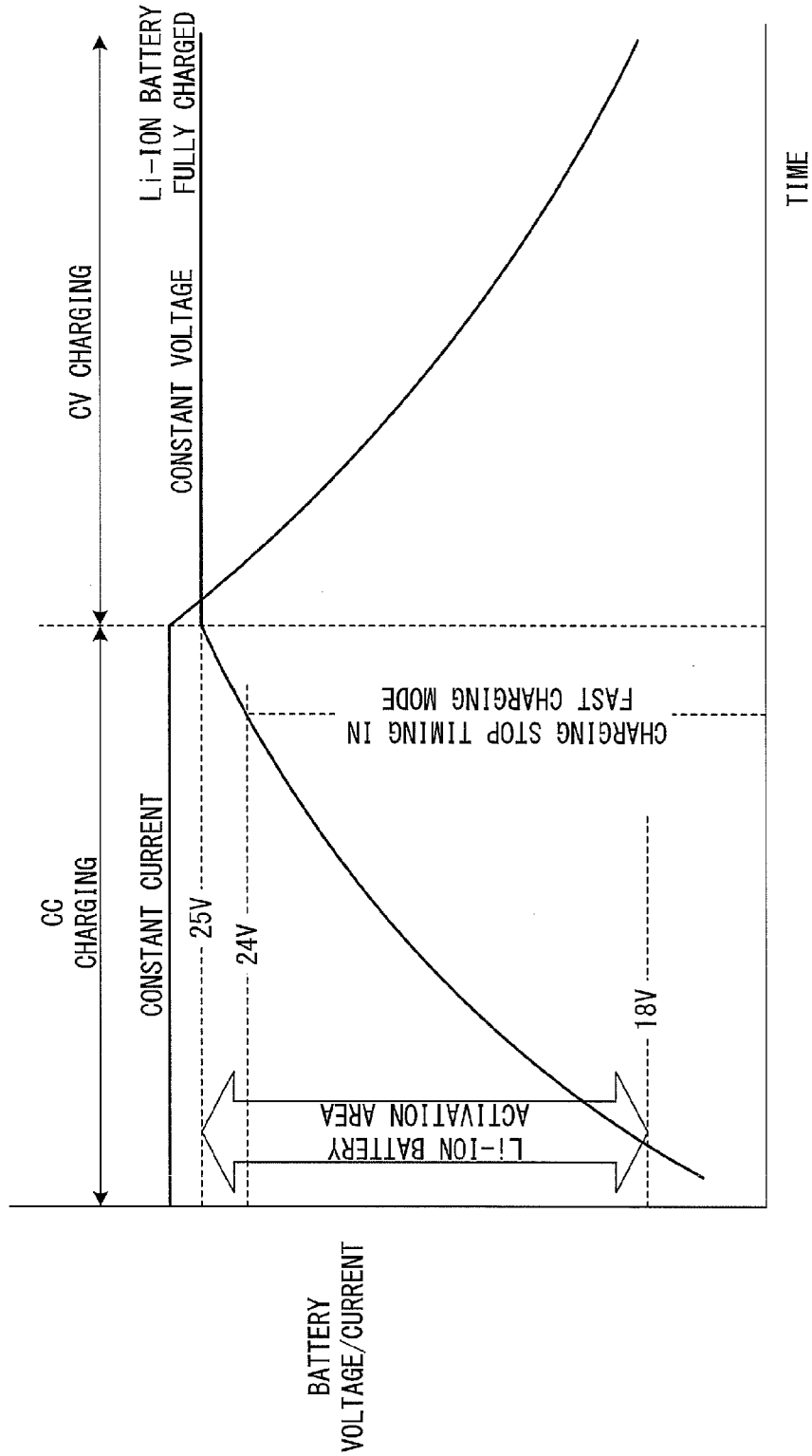
FIG. 10 is a battery charging characteristic diagram illustrating a change of the battery voltage and a change of the supplied charging current during the charging operation according to the second embodiment.
Figure 11:
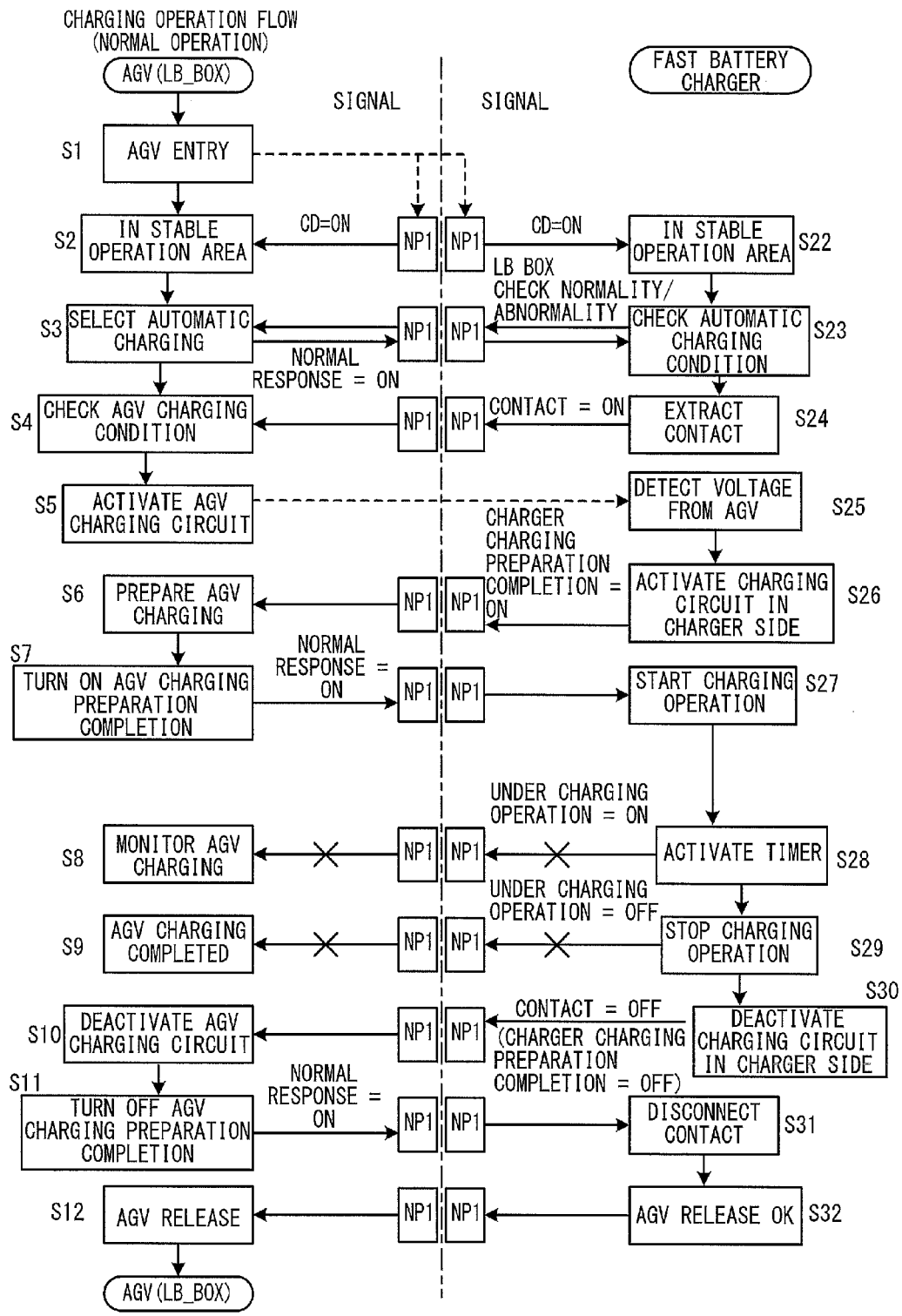
FIG. 11 is a flowchart illustrating operations of the automated guided vehicle and the automatic battery charging unit during the charging operation.

Next, a description will be made for a battery charging management system and a battery charging management method of an automated guided vehicle according to a second embodiment of this embodiment with reference to FIGS. 8 to 11. FIG. 8 is an explanatory diagram illustrating an overview of the travel route. FIG. 9 is a system configuration diagram. FIG. 10 is a characteristic diagram illustrating changes of a battery voltage and a charging current during the charging operation. FIG. 11 is a flowchart illustrating operations of the automated guided vehicle and the automatic battery charging unit during the charging operation.

According to the second embodiment, an LB-type automatic battery charger 3B dedicated to a LB-type automated guided vehicle 1B having a new battery B2 is added to the configuration of the first embodiment. It is noted that like reference numerals denote like elements as in the first embodiment, and they will not repeatedly described for simplicity purposes.

As illustrated in FIG. 8, the charging station CS on the travel route R of the automated guided vehicle 1 according to this embodiment is additionally provided with a PB-type automatic battery charger 3A that performs a charging operation for the battery B1 of the PB-type automated guided vehicle 1A and an LB-type automatic battery charger 3B dedicated to the LB-type automated guided vehicle 1B having the battery B2. The LB-type automatic battery charger 3B newly added for the battery B2 comprises a DC power supply 21A capable to boosting a voltage to an upper limit voltage (for example, 25.02 V) of the battery B2, a charging controller 20A that controls a charging current value and a charging voltage value supplied from the DC power supply 21A to the battery B2, and a communication unit 24 that can communicate with the communication unit 14 of the automated guided vehicle 1 as illustrated in FIG. 9.

The charging controller 20A of the LB-type automatic battery charger 3B is activated after the feeding contactor 23 is connected to the receiving contactor 13, the power switch 12 is closed by the operation of the power receiving control relay 12A of the LB-type automated guided vehicle 1B, and a voltage of the battery B2 before the charging operation is detected. The charging controller 20A charges the battery B2 in a fast charging mode. The fast charging mode is a constant-current constant-voltage charging method in which a charging current larger than that of a normal charging mode is supplied to the battery B2. The fast charging mode is suitable for a conveyance process in which it is necessary to perform the charging operation within a short time. However, the charging controller 20 is also applicable to a constant-current constant-voltage normal charging mode. In the constant-current constant-voltage charging mode, a constant-current charging (CC charging) operation in which a constant charging current is supplied is performed in an initial charging stage. When the battery voltage increases to a full charging voltage (for example, 25 V) as the charging operation is continuously performed, a constant-voltage charging (CV charging) operation in which a constant voltage is supplied is performed until a predetermined time elapses.

FIG. 10 illustrates a change of the battery voltage and a change of the supplied charging current during the charging operation. The battery voltage gradually increases as the CC charging operation is performed. When the battery voltage increases to an upper limitation of the charging voltage (for example, 25 V), a constant-voltage charging (CV charging) operation in which a voltage is constant is executed by lowering the charging current from that timing until a predetermined time elapses. As the predetermined time elapses, the charging controller 20A stops the DC power supply 21A to interrupt the charging operation. Alternatively, the CC charging operation may be performed, and the charging operation may stop as charging completion when the battery voltage of the automated guided vehicle 1B increases to an upper limitation of the charging voltage. If the charging operation is terminated when the battery voltage increases to the upper limitation of the charging voltage, it is possible to omit the constant-voltage charging (CV charging) operation executed only for a predetermined time thereafter and reduce a charging time.

The communication unit 24 can communicate with the communication unit 14 of the LB-type automated guided vehicle 1B to exchange a charging capacity (voltage) of the battery B2, an input/output current amount (ampere-hour, AH) of the battery 13, a history of failure of the battery B, an ON/OFF control signal of the power receiving control relay of the automated guided vehicle 1, other command signals, and the like.

Hereinafter, a sequence of the charging operation for the battery B2 mounted on the LB-type automated guided vehicle 1B will be described with reference to the flowchart of FIG. 11. The left column in the drawing denotes an operation flow of the LB-type automated guided vehicle 1B, and the right column denotes an operation flow of the equipment-side LB-type automatic battery charger 3B. The reference numerals NP1 and NP1 facing each other in the center of the drawing denote communication units by optical communication in the LB-type automated guided vehicle 1B and the equipment-side LB-type automatic battery charger 3B.

When the battery charging controller 11 mounted on the vehicle determines that the charging operation is necessary as the battery voltage decreases, the LB-type automated guided vehicle 1B is controlled to travel to the LB-type automatic battery charger 3B of the charging station CS on the travel route R and stop in a predetermined position (S1).

Then, it is determined whether or not the communication units 14 and 24 of the LB-type automated guided vehicle 1B and the LB-type automatic battery charger 3B can stably communicate with each other (S2, S22). If it is determined that they are in the stable communication range, an automatic charging condition is checked between the LB-type automatic battery charger 3B side and the LB-type automated guided vehicle 1B side (S3, S23). The automatic charging condition is checked such that whether a condition of the battery B2 normal or abnormal is inquired from the LB-type automatic battery charger 3B side to the LB-type automated guided vehicle 1B side, and a normal response is returned from the LB-type automated guided vehicle 1B side.

Then, the feeding contactor 23 expands from the LB-type automatic battery charger 3B to the LB-type automated guided vehicle 1B and is connected to the receiving contactor 13 of the LB-type automated guided vehicle 1B, and a contact ON command is output to the LB-type automated guided vehicle 1B (S24). The LB-type automated guided vehicle 1B checks the charging condition (S4) and activates the power receiving control relay 12A to close the power switch 12 provided in the charging route where the battery B2 and the charging contactor 13 are connected (S5). As the contactors 13 and 23 are connected to each other, and the power switch 12 is closed, the LB-type automatic battery charging unit 3B checks the battery voltage of the LB-type automated guided vehicle 1B (S25).

Then, the LB-type automatic battery charger 3B activates the DC power supply 21A to inquire whether or not a charging preparation operation is completed to the LB-type automated guided vehicle 1B (S26). If it is checked whether or not the charging preparation operation is completed (S6), and the charging preparation operation is completed, the LB-type automated guided vehicle 1B outputs a normal response signal to the LB-type automatic battery charger 3B (S7). The LB-type automatic battery charger 3B supplies the DC power from the DC power supply 21A to the battery B2 of the LB-type automated guided vehicle 1B through the feeding contactor 23, the receiving contactor 13, and the power switch 12 in response to the normal response signal from the LB-type automated guided vehicle 1B, so that the charging operation starts (S27).

The LB-type automatic battery charger 3B activates a charging timer (S28) and stops the DC power supply 21A to interrupt the charging operation when the voltage and the time set in the timer elapse (S29). Meanwhile, the LB-type automated guided vehicle 1B monitors a charging condition of the battery voltage (S8) and checks the charging completion when the charging operation is interrupted (S9).

Then, the LB-type automatic battery charger 3B stops the DC power supply 21A and inquires of the LB-type automated guided vehicle 1B whether or not there is a contact OFF command, and whether or not the charging circuit can be disconnected (S30). The LB-type automated guided vehicle 1B activates the power receiving control relay 12A to open the power switch 12 provided in the charging route where the battery B2 and the charging contactor 13 are connected (S10) and turn off the charging preparation completion of the LB-type automated guided vehicle 1B, so that a normal response (disconnection OK) is output to the LB-type automatic battery charger 3A (S11).

The LB-type automatic battery charger 3B releases connection with the receiving contactor 13 in the LB-type automated guided vehicle 1B side by contracting the feeding contactor 23 in response to the normal response from the LB-type automated guided vehicle 1B (S31), and outputs a release allowance command to the LB-type automated guided vehicle 1B (S32). The LB-type automated guided vehicle 1B travels so as to recede from the charging station CS in response to the release allowance command (S12). Then, the LB-type automated guided vehicle 1B is returned to the travel route R and travels.

According to this embodiment, it is possible to obtain the following effects in addition to the effects (1) of the first embodiment.

(3) The charging station CS is configured to transmit/receive signals to/from the automated guided vehicle 1 using the communication units 14 and 24. In addition, in the charging station CS, the battery charging controller 11 mounted on the vehicle controls open/close of the power switch 12 as a power receiving control switch provided in the middle of the charging route of the vehicle in response to a command from the charging station CS. For this reason, it is possible to activate the power receiving control switch and the receiving contactor 13 of the automated guided vehicle 1B only when communication with the charging station CS is performed. Therefore, it is possible to reduce a power consumption of the power receiving control relay 12A for operating the power receiving control switch and effectively utilize the battery B2. In addition, it is possible to limit the time for activating the receiving contactor 13 only to the charging time. That is, since the receiving contactor 13 is not activated except for the charging operation time, it is possible to minimize or eliminate protection of terminals.

Although embodiments of this invention have been described hereinbefore, they are just for illustrative purposes for embodying the applications of this invention and are not intended to limit the spirit and scope of this invention to such specific configurations.

For example, the aforementioned embodiments may be appropriately combined.

This application is based on and claims priority to Japanese Patent Application Laid-open No. 2012-171713, filed in Japan Patent Office on Aug. 2, 2012, the entire content of which is incorporated herein by reference.

The invention claimed is:

1. A battery charging management system that manages charging operations of automated guided vehicles including a first type of automated guided vehicle that travels in an unpiloted manner by using a first type of mounted battery as a driving source and charges the first type of mounted battery using an automatic battery charger provided in a charging station and a second type of automated guided vehicle that travels in an unpiloted manner by using a second type of mounted battery as a driving source having a full charge voltage lower than a full charge voltage of the first type of mounted battery and charges the second type of mounted battery using the automatic battery charger,
    wherein the first type of automated guided vehicle is not provided with a controller for controlling a voltage of the first type of mounted battery during charging operations,
    the first type of mounted battery is charged while the voltage of the first type of mounted battery is controlled by a first battery charging controller provided in the automatic battery charger,
    the second type of automated guided vehicle is provided with a second battery charging controller that controls a voltage of the second type of mounted battery,
    the second battery charging controller performs a charging operation using the automatic battery charger for the second type of mounted battery in the charging station when the voltage of the second type of mounted battery is lower than a predetermined voltage lower than the full charge voltage of the second type of mounted battery, and
    a charging route of the vehicle is cut off when the voltage of the second type of mounted battery during the charging operation reaches a voltage lower than the full charge voltage of the first type of mounted battery and higher than the predetermined voltage.

2. The battery charging management system of the automated guided vehicle according to claim 1, wherein the second battery charging controller switches a power receiving control switch provided in the charging route of the vehicle to a turn-off state when the voltage of the second type of mounted battery during the charging operation reaches a voltage lower than the full charge voltage of the first type of mounted battery and higher than the predetermined voltage.

3. The battery charging management system of the automated guided vehicle according to claim 2, wherein the second battery charging controller switches the power receiving control switch from the turn-off state to a turn-on state when the voltage of the second type of mounted battery is lower than the predetermined voltage.

4. The battery charging management system of the automated guided vehicle according to claim 3, wherein the second battery charging controller switches the power receiving control switch from the turn-off state to the turn-on state when the voltage of the second type of mounted battery is lower than the predetermined voltage before the second type of automated guided vehicle stops in the charging station.

5. The battery charging management system of the automated guided vehicle according to claim 2, wherein the charging station is configured to transmit/receive a signal to/from the automated guided vehicles using a communication unit, and in the charging station, the second battery charging controller opens or closes the power receiving control switch provided in the charging route of the vehicle in response to a command from the charging station.

6. The battery charging management system of the automated guided vehicle according to claim 1, wherein the second type of mounted battery is a lithium ion battery.

7. A battery charging management method that manages charging operations of automated guided vehicles including a first type of automated guided vehicle that travels in an unpiloted manner by using a first type of mounted battery as a driving source and charges the first type of mounted battery using an automatic battery charger provided in a charging station and a second type of automated guided vehicle that travels in an unpiloted manner by using a second type of mounted battery as a driving source having a full charge voltage lower than a full charge voltage of the first type of mounted battery and charges the second type of mounted battery using the automatic battery charger,
    wherein the first type of automated guided vehicle is not provided with a controller for controlling a voltage of the first type of mounted battery during charging operations,
    the first type of mounted battery is charged while the voltage of the first type of mounted battery is controlled by a first battery charging controller provided in the automatic battery charger,
    when the second type of mounted battery of the second type of automated guided vehicle is charged, a second battery charging controller provided in the second type of automated guided vehicle controls a voltage of the second type of mounted battery,
    a charging operation using the automatic battery charger is performed for the second type of mounted battery in the charging station when the voltage of the second type of mounted battery is lower than a predetermined voltage lower than the full charge voltage of the second type of mounted battery, and
    a charging route of the vehicle is cut off when the voltage of the second type of mounted battery during the charging operation reaches a voltage lower than the full charge voltage of the first type of mounted battery and higher than the predetermined voltage.

* * * * *